United States Patent
Gottfurcht et al.

(10) Patent No.: US 6,600,497 B1
(45) Date of Patent: Jul. 29, 2003

(54) APPARATUS AND METHOD TO NAVIGATE INTERACTIVE TELEVISION USING UNIQUE INPUTS WITH A REMOTE CONTROL

(75) Inventors: Elliot A. Gottfurcht, 1018 Hartzell, Pacific Palisades, CA (US) 90272; Grant E. Gottfurcht, 1018 Monument, Pacific Palisades, CA (US) 90272; J. Teague McKnight, Los Angeles, CA (US); Manuel V. Beltran, Westminster, CA (US); Stephen K. Woesner, Santa Ana, CA (US); John A. Marinuzzi, Los Alamos, NM (US); Albert-Michel C. Long, Irvine, CA (US); Donald L. Dukeshire, Huntington Beach, CA (US)

(73) Assignees: Elliot A. Gottfurcht, Los Angeles, CA (US); Grant E. Gottfurcht, Pacific Palisades, CA (US); Marlo L. Longstreet, Los Angeles, CA (US)

( * ) Notice: Subject to any disclaimer, the term of this patent is extended or adjusted under 35 U.S.C. 154(b) by 0 days.

(21) Appl. No.: 09/440,214

(22) Filed: Nov. 15, 1999

(51) Int. Cl.⁷ .............................. G09G 5/00; G06F 15/16
(52) U.S. Cl. ........................ 345/735; 345/701; 345/713; 709/246
(58) Field of Search ................................. 345/655, 701, 345/713, 738–739, 742, 762, 763, 764, 734; 709/246; 707/503, 504, 514

(56) References Cited

U.S. PATENT DOCUMENTS

| | | | |
|---|---|---|---|
| 4,706,121 A | 11/1987 | Young | |
| 5,479,268 A | 12/1995 | Young et al. | |
| 5,625,781 A | 4/1997 | Cline et al. | |
| 5,758,126 A | 5/1998 | Daniels et al. | |
| 5,801,702 A | 9/1998 | Dolan et al. | |
| 5,809,204 A | 9/1998 | Young et al. | |
| 5,828,839 A | 10/1998 | Moncreiff | |
| 5,896,133 A | 4/1999 | Lynch et al. | |
| 5,900,905 A | 5/1999 | Shoff et al. | |
| 5,902,353 A | 5/1999 | Reber et al. | |
| 5,903,729 A | 5/1999 | Reber et al. | |
| 5,911,145 A | 6/1999 | Arora et al. | |
| 5,956,681 A | 9/1999 | Yamakita | |
| 5,958,012 A | 9/1999 | Battat et al. | |
| 6,002,853 A | 12/1999 | de Hond | |
| 6,031,537 A | * 2/2000 | Hugh | 345/839 |
| 6,054,989 A | * 4/2000 | Robertson et al. | 345/727 |
| 6,072,492 A | 6/2000 | Schagen et al. | |
| 6,075,575 A | * 6/2000 | Schein et al. | 345/684 |
| 6,091,417 A | 7/2000 | Lefkowitz | |
| 6,101,473 A | * 8/2000 | Scott et al. | 704/275 |
| 6,151,059 A | * 11/2000 | Schein et al. | 725/37 |
| 6,151,630 A | 11/2000 | Williams | |
| 6,160,552 A | 12/2000 | Wilsher et al. | |
| 6,177,936 B1 | 1/2001 | Cragun | |

(List continued on next page.)

OTHER PUBLICATIONS

Chieko Asakawa, "User Interface of a Home Page Reader," Apr. 15, 1998, 8 pages, Assets '98, Marina del Rey, California.

Primary Examiner—Kristine Kincaid
Assistant Examiner—Thomas J Joseph
(74) Attorney, Agent, or Firm—Blakely, Sokoloff, Taylor & Zafman LLP

(57) ABSTRACT

A method and system to facilitate navigation of a wide-area network. A navigation matrix is displayed on a client node. The matrix pairs each navigation option with an input such that, for example, pressing a single key activates that navigation option. The key press event is forwarded to an information and services hub across the network. The hub then returns a next appropriate matrix layer which may be navigated in the same manner.

20 Claims, 24 Drawing Sheets

U.S. PATENT DOCUMENTS

| | | |
|---|---|---|
| 6,199,098 B1 | 3/2001 | Jones et al. |
| 6,229,540 B1 * | 5/2001 | Tonelli et al. ............... 345/735 |
| 6,237,030 B1 | 5/2001 | Adams et al. |
| 6,243,093 B1 * | 6/2001 | Czerwinski et al. ........ 345/764 |
| 6,266,060 B1 | 7/2001 | Roth |
| 6,269,403 B1 * | 7/2001 | Anders ....................... 709/231 |
| 6,271,832 B1 * | 8/2001 | Kamaeguchi et al. ....... 345/158 |
| 6,286,017 B1 * | 9/2001 | Egilsson .................... 707/503 |
| 6,292,782 B1 * | 9/2001 | Weideman ................... 704/273 |
| 6,295,057 B1 | 9/2001 | Rosin et al. |
| 6,330,005 B1 * | 12/2001 | Tonelli et al. ............... 345/735 |
| 6,333,753 B1 * | 12/2001 | Hincley ....................... 345/768 |
| 6,334,145 B1 * | 12/2001 | Adams et al. ............... 709/217 |
| 6,336,131 B1 * | 1/2002 | Wolfe et al. ................. 709/203 |
| 6,388,714 B1 | 5/2002 | Schein et al. |
| 6,421,071 B1 * | 7/2002 | Harrison ..................... 345/787 |

\* cited by examiner

US 6,600,497 B1

APPARATUS AND METHOD TO NAVIGATE INTERACTIVE TELEVISION USING UNIQUE INPUTS WITH A REMOTE CONTROL

BACKGROUND (1) Field of the Invention

The invention relates to electronic information services and electronic commerce services. More specifically, the invention relates to providing easy navigation to facilitate access to such services.

(2) Background

The advent of the Internet has made a vast amount of information available to a significant segment of the population. Even so, over 150 million people in the U.S. do not use the Internet, including 80% of people over 45 and 89% of people over 55. There are currently over 800 million pages of information spread over 3 million information servers on the Internet. The vast majority of this information is commercial in nature, making up 83% of the content. Of the remaining 17%, the majority is scientific or educational. This would tend to indicate that if one does not have access to these growing resources, then one is at a definite disadvantage.

While user interfaces are vastly more user-friendly now than in the days of character-based terminals, such as DOS, the current Internet navigation systems are still too cumbersome and require too much specialized knowledge for many people to use effectively. There are too many protocols, too many standards, and too many methods for performing seemingly simple tasks. Just the act of setting up a computer with a minimal configuration is challenging and complex, so much so that many people will not gain access to the vast array of services available over the Internet. Technology generally evokes fear particularly among the older generation and the poor, who have had little or no exposure to it. The net effect of this fear combined with cost factors has been to deny access to this large and growing segment of the population.

At this stage, electronic information services and electronic commerce services have reached the point of mass momentum. Unfortunately, those that cannot access these products and services are being disenfranchised due to technical capabilities, age, and/or socio-economic status.

BRIEF SUMMARY OF THE INVENTION

A method and system to facilitate navigation of a widearea network is disclosed. A navigation matrix is displayed on a client node. The matrix pairs each navigation option with an input such that, for example, pressing a single key activates that navigation option. The key press event is forwarded to an information and services hub across the network. The hub then returns a next appropriate matrix layer which may be navigated in the same manner.

DETAILED DESCRIPTION

A simplified system for navigation of the Internet or other content source allows a broader user base access to the content and services available thereon. In one embodiment, the hardware is designed to be low cost and immediately usable out of the box. This is expected to further expand access to the electronic world.

Figure 1:
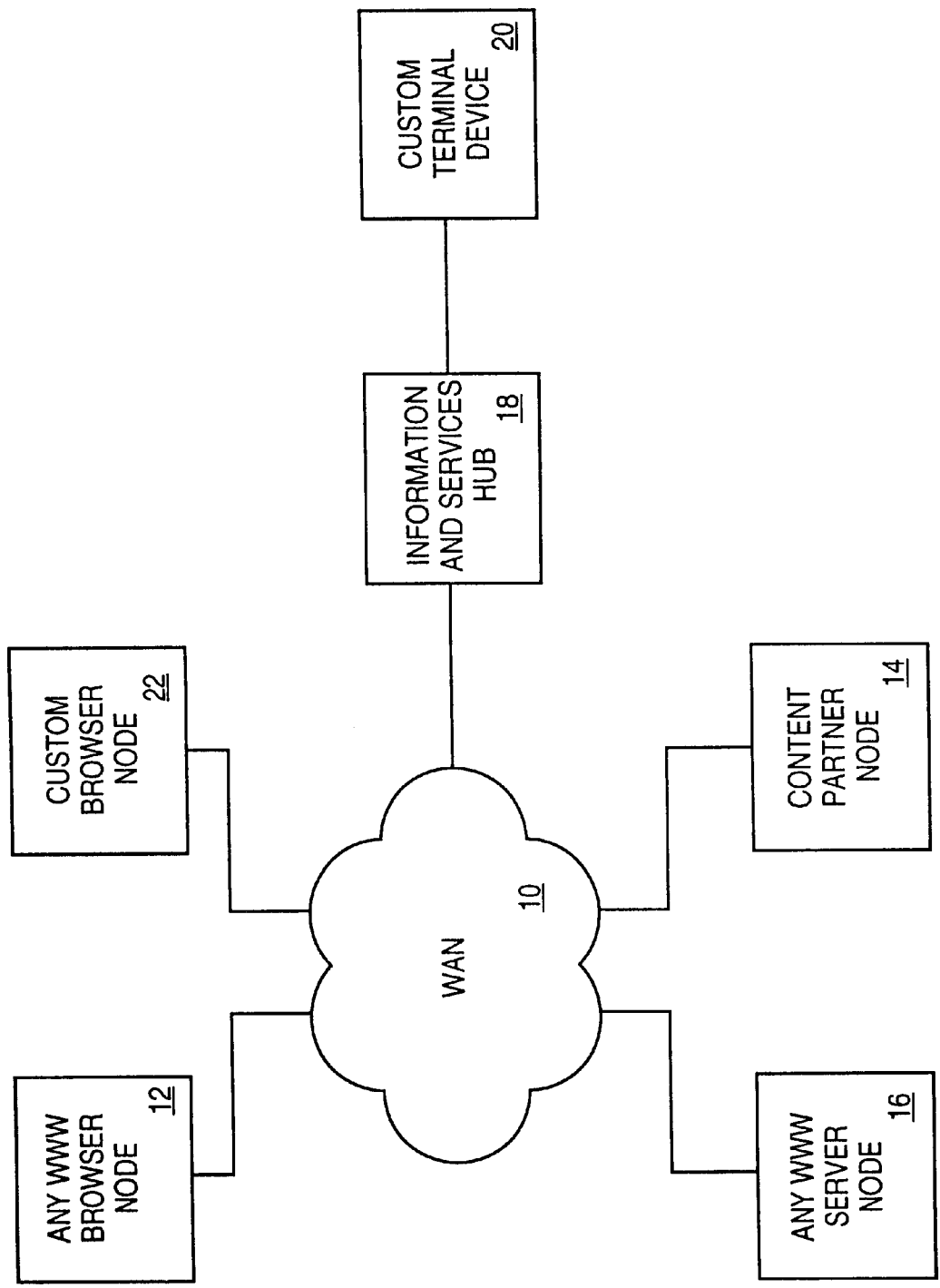
FIG. 1 is a block diagram of a system employing one embodiment of the invention.

FIG. 1 is a block diagram of a system employing one embodiment of the invention. A wide-area network (WAN) 10, such as the Internet, couples together a plurality of communication nodes. Some nodes, such as node 12, may be a standard prior art personal computer (PC) executing any conventional web browser. Additionally, there are server nodes connected to WAN 10, such as server node 16, which may be any conventional web server. The information and services hub (ISH) 18 is coupled to WAN 10 and provides an interface for custom terminal device 20. It is anticipated that the number of custom terminal devices may be arbitrarily large. Also coupled to WAN 10 are browser nodes running a custom browser that facilitate access to information and services provided by the ISH 18. The ISH 18 provides content in a specified format for both the custom terminal device 20 and the custom browser node 22 (client nodes). Some of that content is provided by content partners, such as content partner node 14. Content partners provide content to the information and services hub in a specified format that facilitates its use by the client nodes 20, 22. As a practical matter, both the custom browser node 22 and the custom terminal device 20 will act as though there is a point-to-point link between them and the ISH 18. This apparent point-to-point link limits the knowledge a user requires, including, for example, sheltering the user from proprietary addressing schemes, and therefore, permits vastly simplified navigation of content available over WAN 10.

Figure 2:
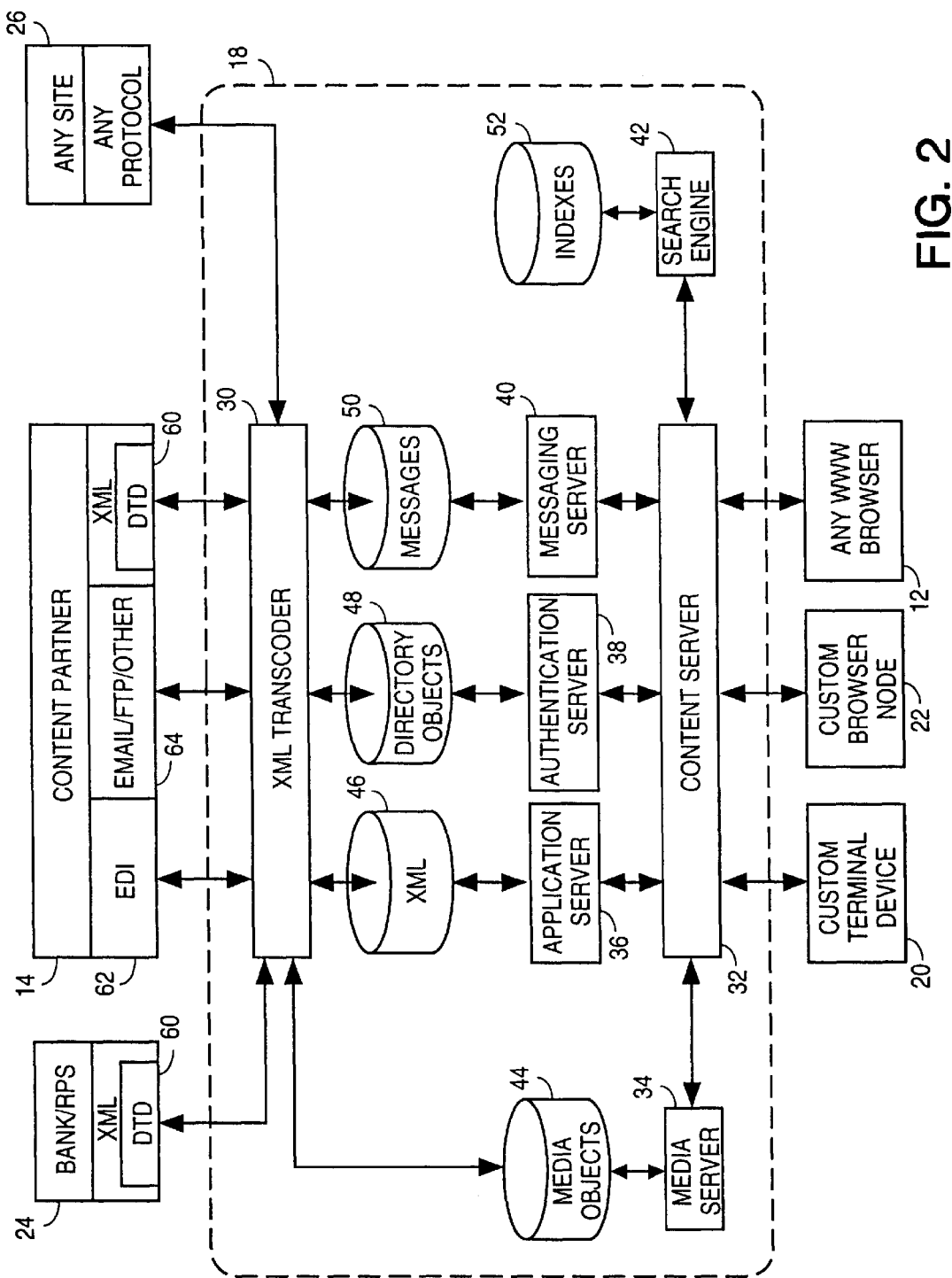
FIG. 2 is a more detailed block diagram of the information services hub.

FIG. 2 is a more detailed block diagram of the information services hub. ISH 18 has various information and services sources, including any site 26, content partner 14, and bank 24. Bank 24 may be any remittance processing service or other financial institution. It also has a number of content or service sinks, such as terminal device 20, custom browser node 22, and any browser node 12. Within ISH 18, the content server 32 provides an interface between the content sinks and the ISH content and services. On the back end, content server 32 is coupled to a number of backend servers. Media server 34 is responsible for providing video and audio streaming content from media objects database 44 to the content server 32 for supply to various content sinks. Search engine 42 is also coupled to content server 32, as well as index database 52. Index database 52 can be created in any traditional indexing manner, including spidering or categorical indexing. Search engine 42 permits the content sinks to do traditional web searching based on the indexing in the index database 52. A messaging server 40 permits e-mail, chat and collaboration fora between the content sinks and any other web node. Authentication server 38 provides security and controls access to various content. The authentication server 38 is coupled to a directory objects database 48 which may hold passwords and encryption keys, and other security-related objects.

Application server 36 is coupled to the content server 32 and the extensible markup language (XML) database 46. The application server 36 provides applications to the content sinks via the content server 32. The applications server 36 can provide services from within the ISH 18 or those provided from, for instance, content partner 14. As one example, the application server may provide access to a locally hosted Java-based word processor. Alternatively, it may provide access to a mapping application provided by some third party, such as Vicinity, of Palo Alto, Calif., or MapQuest, of Denver, Colo.

The XML transcoder 30 receives incoming data from the various possible content sources. XML transcoder 30 parses incoming data and insures the data is placed in the correct database and in an appropriate format. For content partners, an ISH document-type definition (DTD) formats their data for inclusion in the ISH 18. Thus, when the XML transcoder 30 receives a document formatted in the standard DTD 60, it may be a mere conduit to one of the various databases within the ISH 18. Content partners are expected to provide other services, including electronic data interchange (EDI), which is a currently accepted standard for transacting purchases between wholesalers and retailers. Some embodiments of the ISH will accept EDI in various formats, including ASC X12, EDI FACT, and ANSI X.12. When an EDI transmission is received by the XML transcoder 30, it will be transcoded to XML, and the data made available to the appropriate service or repository. Some content partners may only support established proprietary file formats, which are transferred using e-mail or FTP services 64. The XML transcoder provides automated processing of files transferred in this manner. This may include parsing of data received and mapping of the data element into data fields of the ISH.

The XML transcoder 30 also brokers transactions with banking and remittance processing services (RPS) 24. In some of the embodiments, an ISH DTD 60 is provided to the bank site to facilitate transaction processing using XML. The XML transcoder 30 is also designed to repurpose content from non-content partners, such as any site 26 to a format suitable for navigation, using the simplified navigation system described further below. For example, at a minimum, an arbitrary server provides some HTML code which can be transcoded to XML by the transcoder 30. Some specialty graphics, like Shockwave from Macromedia, Inc., can be explicitly handled by the transcoder or dropped as part of the transcoding.

Figure 3:
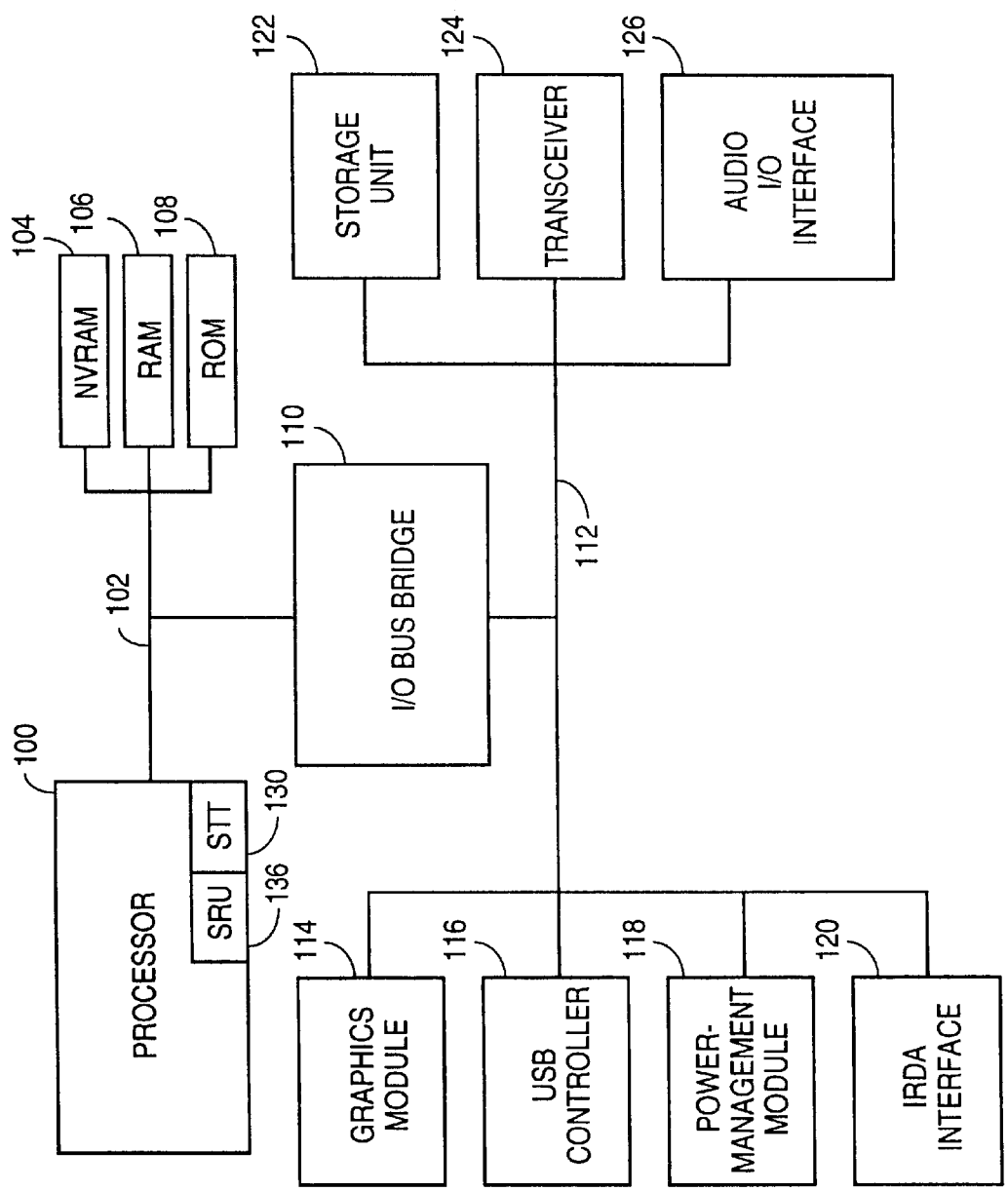
FIG. 3 is a block diagram of terminal hardware architecture of one embodiment of the invention.

FIG. 3 is a block diagram of a custom terminal hardware architecture of one embodiment of the invention. A processor 100 is coupled to various memory units and an I/O bus bridge 110 by a local bus 102. Among the expected memory units are random access memory (RAM) 106, which may be any standard RAM, including standard dynamic random access memory (DRAM), and may be symmetric or asymmetric. Also coupled to bus 102 is a read-only memory (ROM) unit 108. The ROM will typically include the boot code for the processor 100. A non-volatile RAM (NVRAM) unit 104 is also coupled to the bus. In one embodiment of the invention, the NVRAM unit 104 will contain a user interface for simplified navigation. By using NVRAM instead of ROM for storage of the code implementing the interface, as the interface is updated, it can be dynamically modified without requiring the user to open the box or contact service personnel. For example, any time an update of the user interface program is available, the ISH may prompt the user to accept an upgrade. The ISH can then replace the user interface program in the NVRAM with the updated version without further user knowledge or inconvenience.

The I/O bus bridge 110 is coupled to the local bus 102 and bridges to the I/O bus 112. A number of units may reside on the I/O bus, including a graphics module 114 that couples to a display (not shown), a universal serial bus (USB) controller that may couple the system to any number of additional USB devices. Common USB devices include keyboards, mice, cameras, scanners, printers, and other peripheral components and input/output devices. Also coupled to the I/O bus may be power management module 118, which may be coupled to the power switch and may include conventional power conservation protocols, ensuring the processor 100 is permitted to orderly conclude its current operation before changing power states.

An infrared data association (IrDA) interface 120 permits the terminal to be coupled to hand-held devices, if desired. In some embodiments, a keyboard may be coupled by an Ir link. Storage unit 122, which may, for example, be a flash memory unit, is used for long-term storage of data or files. A transceiver 124 is used to permit the processor to communicate with the hub, whether it be a point-to-point link or across a wide-area network. The transceiver 124 may be, but is not limited to, an ethernet transceiver, a modem, digital subscriber line (DSL) or cable modem. It is expected that the processor 100 will communicate through the transceiver 124 to the ISH using transmission control protocol/internet protocol (TCP/IP) or point-to-point protocol (PPP). Encryption and compression within the terminal may be handled by conventional hardware or software solutions.

Audio I/O interface 126 may include an internal microphone and speaker which permits audio input and output. This is particularly useful in the context of voice e-mail or voice over IP communications. Additionally, some embodiments of the invention will include speech to text (STT) capability 130 and speech recognition (SR) capability 136. Various embodiments may implement these capabilities as hardware or software or a combination of both. In embodiments having SR capability, for simplicity of use, it is desirable to use one of the multiple user SR packages available today and expected to improve in the future, as these packages avoid the necessity of "training" the system. This permits recognition of content of speech and conversion to text.

For purposes of reduced cost, it may be desirable to use a particularly simple speech recognition package, recognizing only, for example, numbers and letters. A suitable speech recognition package will permit a user to navigate the WAN as subsequently described using voice commands and composed e-mails in a hands-free manner. Such an embodiment has the additional advantage that it enables Internet access to the physically challenged. In some embodiments, SR 136 is present, but STT 130 is not. This may permit the processor to respond to voice commands but would not permit composition of e-mail, for example.

In one embodiment of the invention, the terminal has a notebook form factor with an integrated LCD display. In an alternative embodiment, the form factor is a set-top box, which relies on an external display, such as a television or external monitor. While in either case, a standard QWERTY keyboard could be used, it is believed that a custom keypad will facilitate ease of navigation.

Figure 4A:
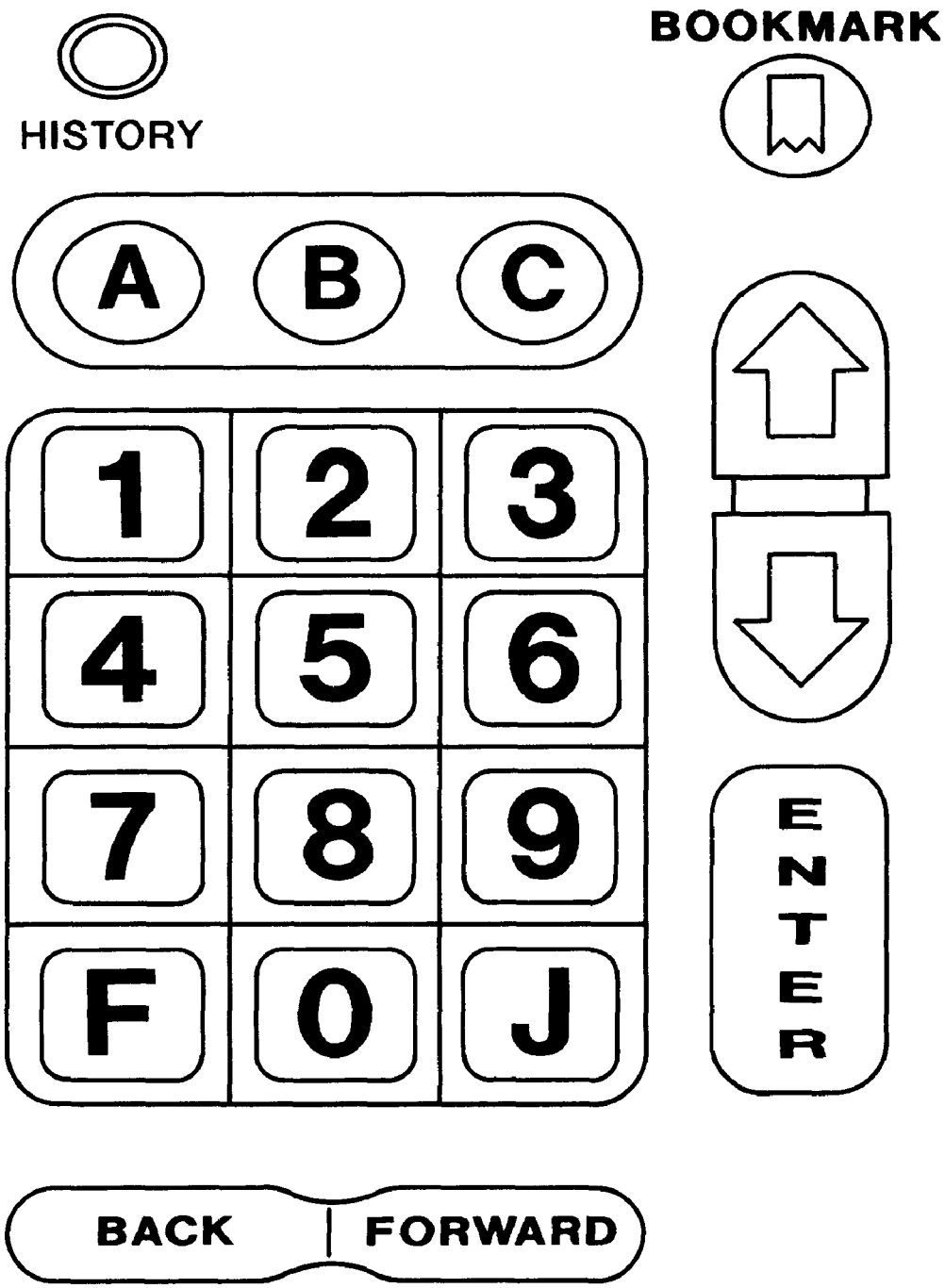
FIG. 4a shows one such custom keypad for the notebook form factor.
Figure 4B:
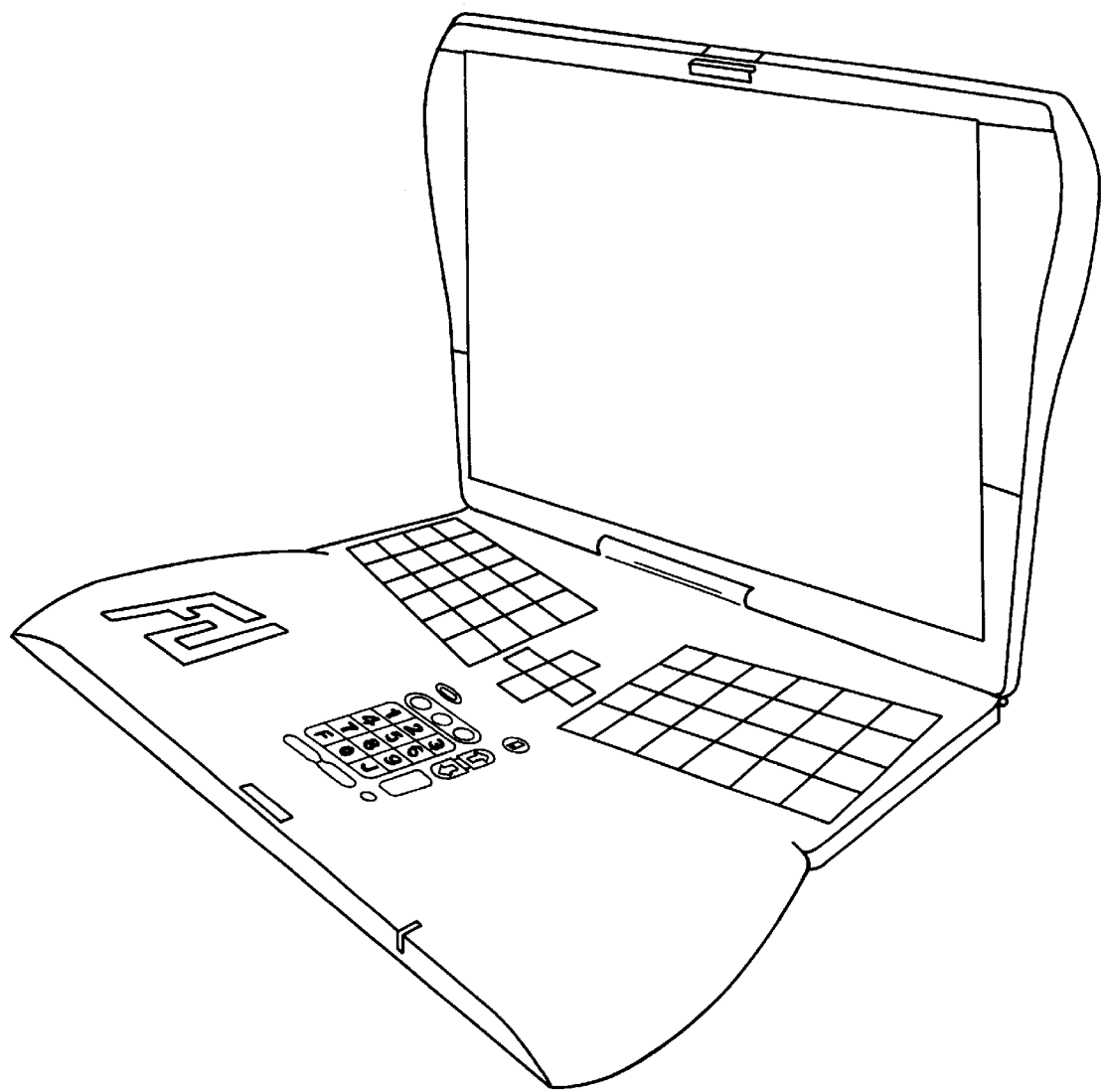
FIG. 4b shows one example of a notebook form factor of one embodiment of the invention.

FIG. 4a shows one such custom keypad for the notebook form factor. It is envisioned that this keypad may be placed adjacent to a standard QWERTY keyboard similar to the placement of the specialized functions, calculator digits and arrow keys of a standard extended keyboard. Alternatively, this keypad may be placed in the middle of a standard QWERTY keyboard separating the right- and left-hand portions of the keyboard. In a third embodiment, no QWERTY keyboard is provided and this is the sole input keypad of a device. Other arrangements are within the scope and contemplation of the invention. FIG. 4b shows one example of a notebook form factor of one embodiment of the invention.

Figure 5:
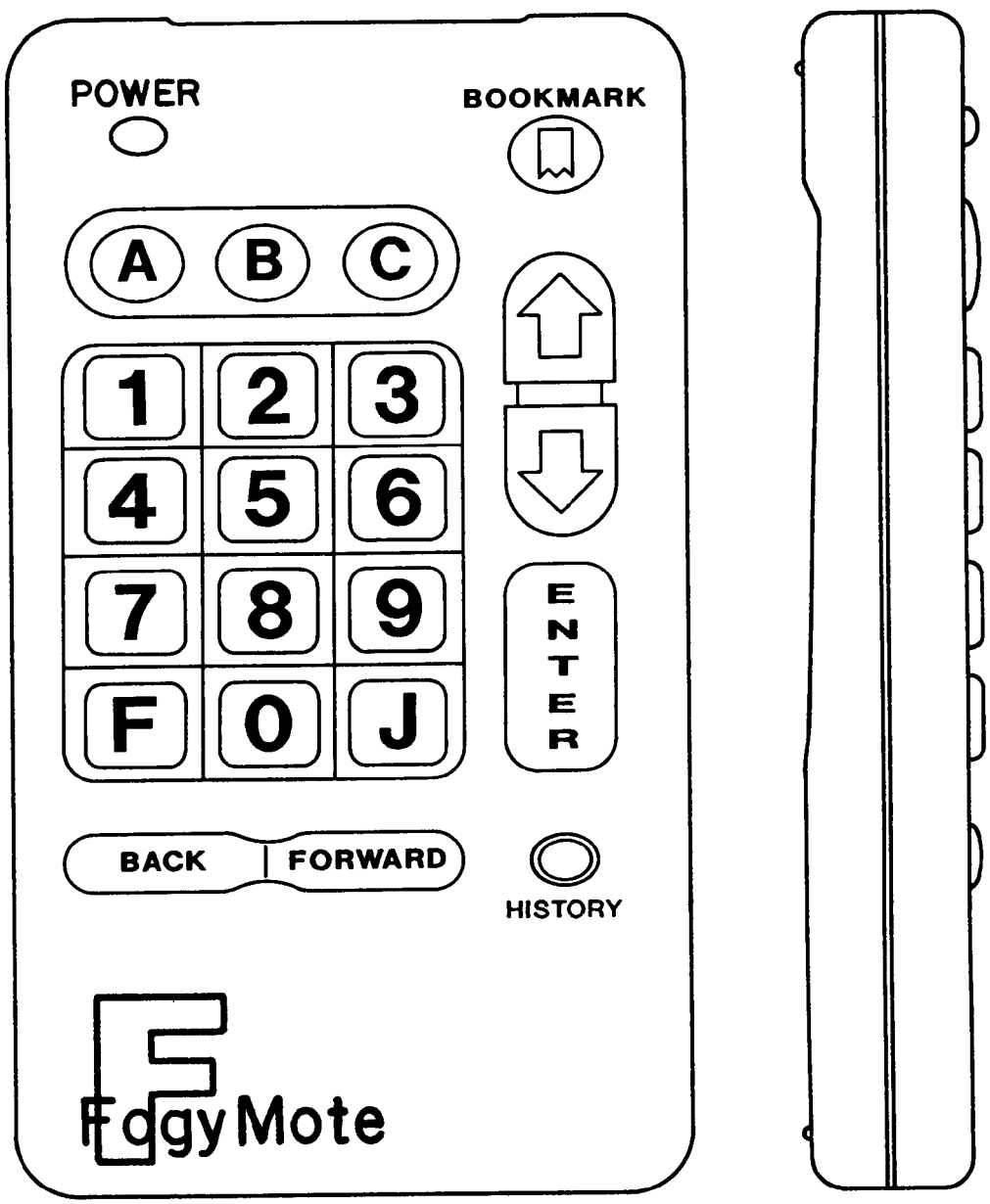
FIG. 5 is a diagram of a remote control which may be used to interface with the set-top box embodiment of the terminal hardware.

FIG. 5 shows a remote control that may be used to interface with the set-top box embodiment of the terminal hardware. Common to these keypads are keys for digits 0–9, keys for letters A–C, and branded keys F and J. The remote control may use conventional infrared signaling. Also provided are special function keys for history and bookmarks, forward and back, up and down arrow keys, and an enter key. The settop box form factor may also have a USB or infrared keyboard as an additional input device.

Figure 6:
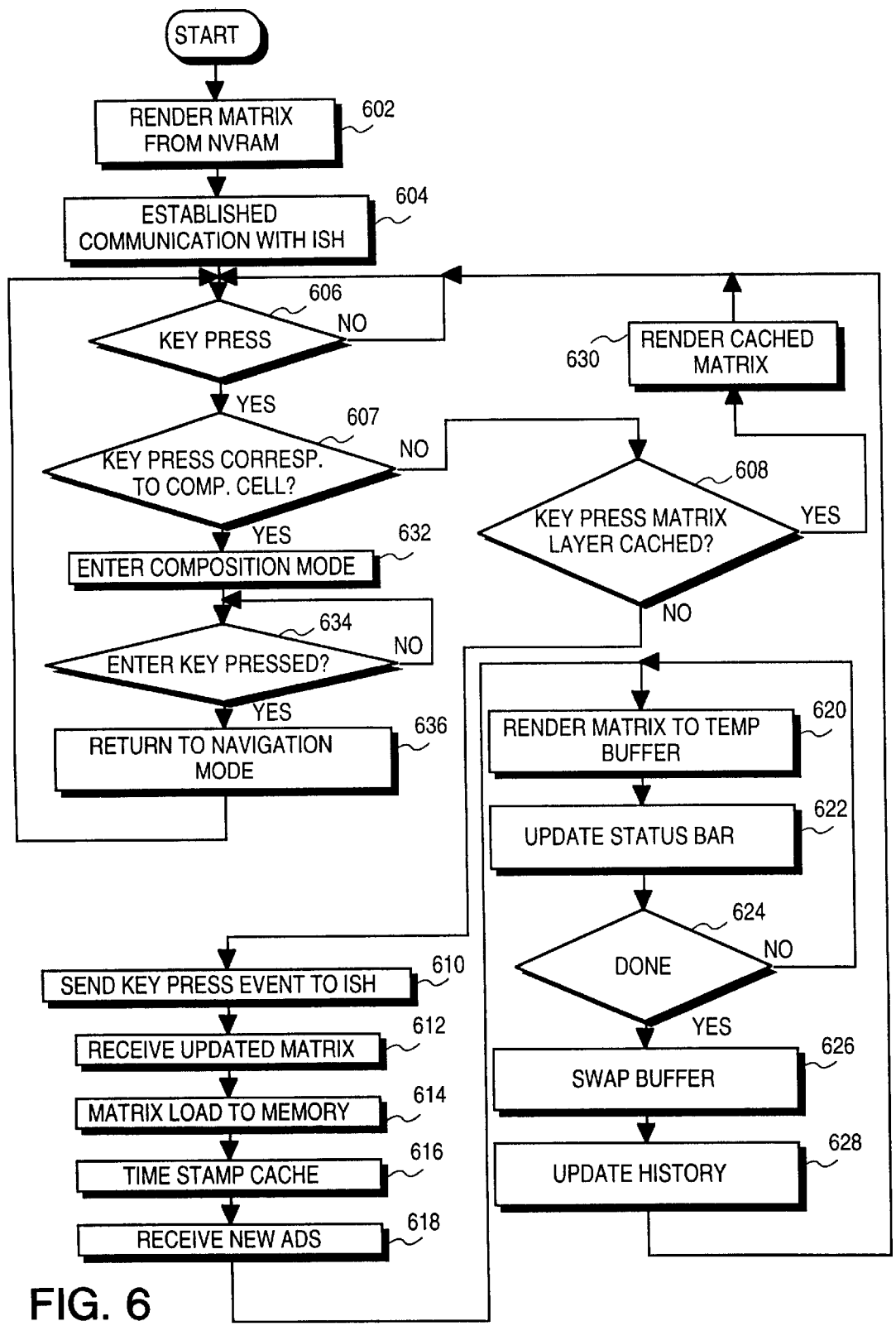
FIG. 6 is a flow chart of operations of the navigation system of one embodiment of the invention in a custom terminal custom browser mode.

FIG. 6 is a flow chart of operations of the navigation system of one embodiment of the invention in a custom terminal custom browser mode. Upon power-up at functional block 602, a navigation matrix layer is rendered from the NVRAM. At functional block 604, a node establishes communication with the ISH. At decision block 606, the node waits for a keypress. If at decision block 606, a determination is made that a key has been pressed, a determination is made at decision block 607 whether the keypress corresponds to a composition cell. A composition cell is deemed to be a cell in the navigation matrix which permits a user to enter additional data. For example, a search cell or e.g., a purchase order form or an e-mail may have one or more composition cells. If the cell is a composition cell, the system enters composition mode at functional block 632. In composition mode, the digits of the keypad represent the digits themselves, rather than navigation options. The cursor will also appear in the composition field of the composition cell. At decision block 634, a determination is made if the enter key has been pressed. The enter key is defined in one embodiment of the invention to signify the end of a composition. Thus, if the enter key has not been pressed, the system remains in composition mode. However, if at decision block 634, the enter key has been pressed, the system returns to navigation mode at functional block 636. It is also within the scope and contemplation to define other keys to instigate return to the navigation mode.

If a keypress is received and not found to correspond to a composition cell at decision block 607, a determination is made at decision block 608 whether the matrix layer corresponding to the keypress exists within the cache. In this connection, it is determined whether a representation of that matrix layer, even if in the cache, is stale and therefore needs to be freshly downloaded. If the data is stale or not present in the cache at all, the keypress event is sent to the ISH. In one embodiment, the entire navigation path, including the keypress event, is sent with each keypress. When the navigation path is sent with each keypress event, the ISH is able to identify the requested matrix layer rapidly on the fly.

Subsequently, at functional block 612, the client node receives the updated matrix layer corresponding to the keypress event. That matrix layer is loaded to the memory at functional block 614 and the cache is time-stamped at functional block 616. At functional block 618, new ads may be received from the ISH. Notably, the receipt of the ads is asynchronous with the matrix layer receipt and may occur at any time without being prompted by a keypress event. At functional block 620, the incoming matrix layer is rendered to a temporary buffer by using a double-buffering technique. The actual rendering is transparent to the user. At functional block 622, the status bar for the load is updated to indicate the percent complete of the matrix layer rendering. At functional block 624, a determination is made if the rendering is complete. If it is not, the buffer continues to render and the status bar continues to update. By regularly updating the status bar, the user is not left wondering if the device is working. This is expected to limit the frustration experienced by many new users during the wait while matrix layers are rendered. If the rendering is complete, the temporary buffer is swapped with the frame buffer and the new matrix layer is displayed at functional block 626. Then at functional block 628, the history of the navigation path is updated to reflect the new matrix layer. The system then returns to await a next keypress to indicate further navigation. By iteratively pressing appropriate keys, a user may navigate to any desired depth up to a maximum depth along any navigation path and obtain content relevant to the path navigated. If instead, the matrix layer was validly in the cache at decision block 608, the matrix layer is rendered from the cache at functional block 630 and the system awaits the next keypress.

"Maximum depth" as used herein applies on a cell by cell basis for primary navigation options. A maximum depth is reached for a cell in a navigation path when pressing a corresponding key will not take a user to a deeper matrix layer in the matrix. While content, as distinguished from the matrix layer and their cell headings, will be displayed once a maximum depth is reached, it is within the scope and contemplation of the invention to display some content in cells of an intermediate matrix layer, i.e. one that is not at the maximum depth.

"Primary navigation options" as used herein are those navigation options that necessarily change between successive matrix layers, changing from general to more specific with increases in depth in the matrix.

Figure 7:
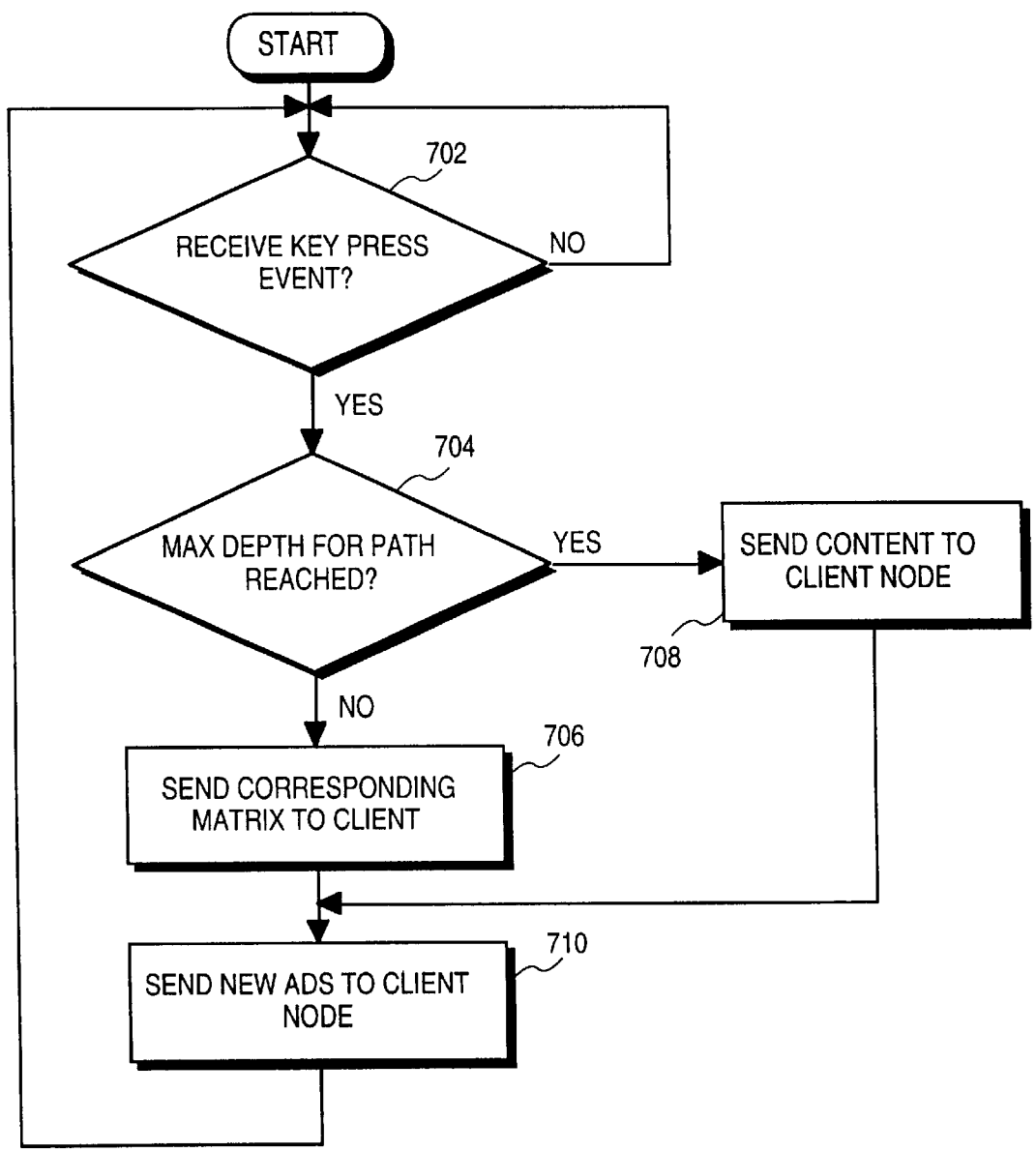
FIG. 7 is a flow diagram of operation of the information services hub of one embodiment of the invention.

FIG. 7 is a flow diagram of operation of the information services hub of one embodiment of the invention. A determination is made if the keypress event has been received at decision block 702. If the keypress event has been received, a determination is made if the matrix has reached maximum depth at decision block 704. If the matrix has not reached the maximum depth, a matrix layer corresponding to the keypress is sent at functional block 706. Such matrix layers may or may not include content in cells with navigation choices. If the matrix has reached maximum depth for that navigation path, a content layer corresponding to the keypress event is sent to the client node at functional block 708. A content layer may or may not include matrix cells in addition to the content. New ads are sent to the client node at functional block 710. The system then awaits the next keypress event from a client node.

Figure 8:
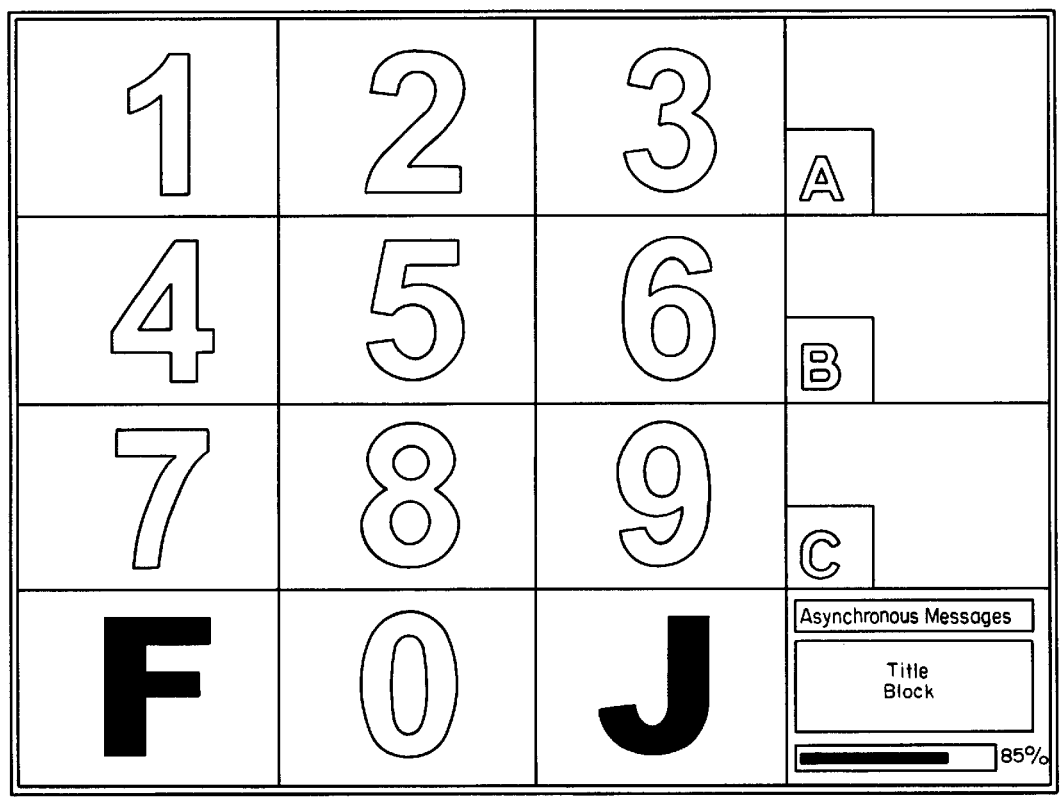
FIG. 8 is a diagram of the display of a graphical user interface of one embodiment of the invention.

FIG. 8 is a diagram of the display of a graphical user interface of one embodiment of the invention. The screen is divided into a plurality of cells. In this embodiment, there are fifteen cells that represent navigation options and one messaging cell for displaying messages from the hub, the progress or status bar, and a title block. The cells can further be subdivided between the digit keys 1–9 keys which, in this embodiment, represent the primary set of navigation options and the keys designated by letters A–C which represent secondary navigation options and F, 0, and J keys that each cause generation of a particular matrix layer, regardless of where in the matrix those 3 cells are selected. Typically, the F and J cells represent channels within the ISH. The ABC cells will typically hold advertising, and selecting one of those cells will generate a matrix layer with primary navigation cells directed to that advertiser or the product line being advertised. While the interface is designed to be fully accessible with minimal key strokes from a key pad, it is also within the scope and contemplation of the invention to permit selection with a mouse or other pointer device. Additionally, referring to FIGS. 4 and 5, the arrow keys may be used to scroll through the navigation options with the enter key activating the navigation option corresponding to the selected cell.

Figure 9A:
FIG. 9a shows a Main Menu matrix of one embodiment of the invention.
Figure 9B:
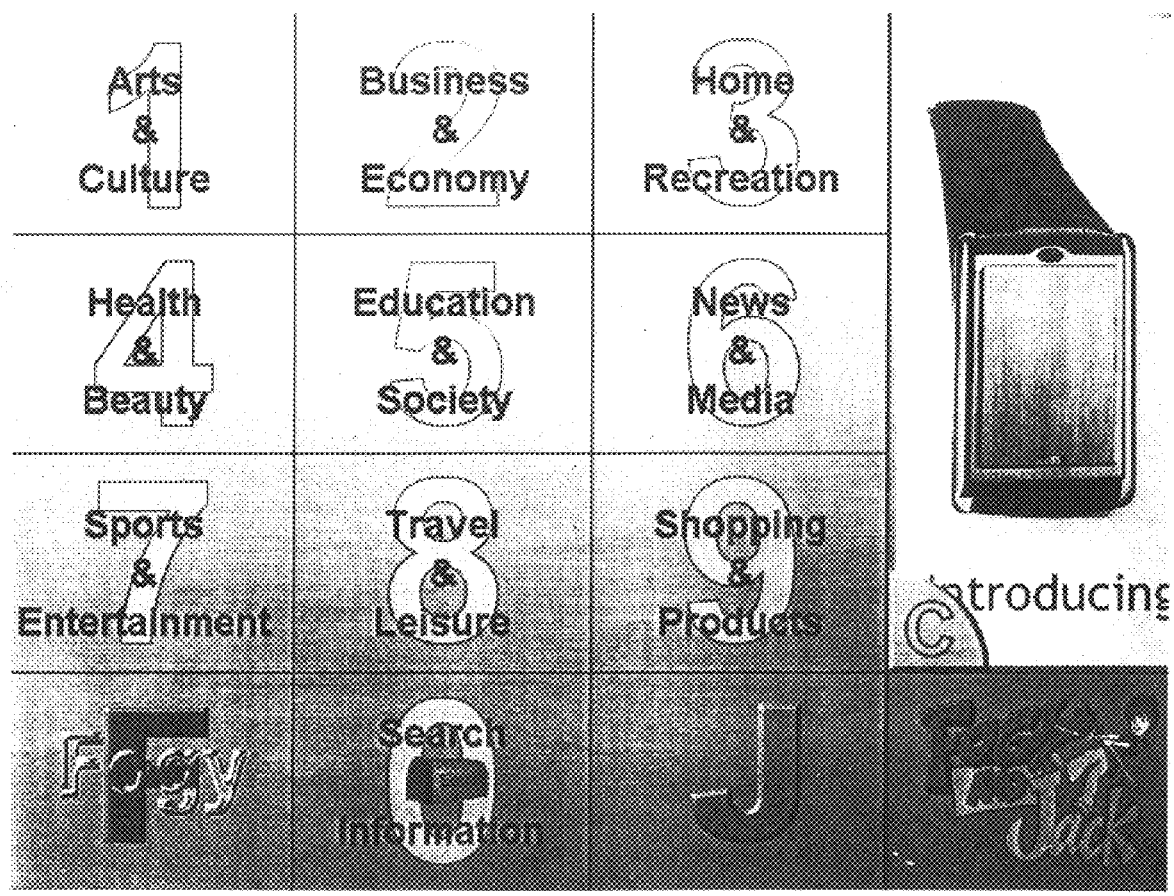
FIGS. 9b and 9c are the home matrix layers for the F and J channels, respectively.
Figure 9C:
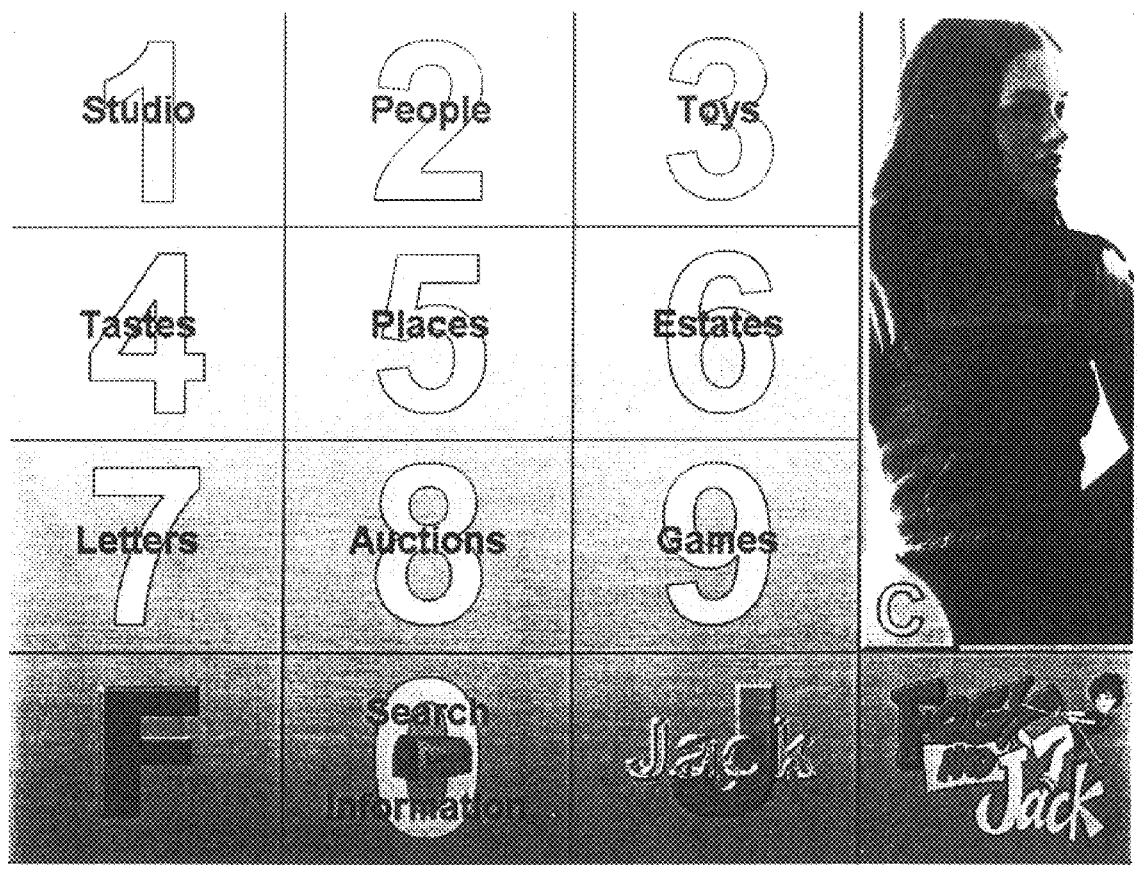
Figure 9D:
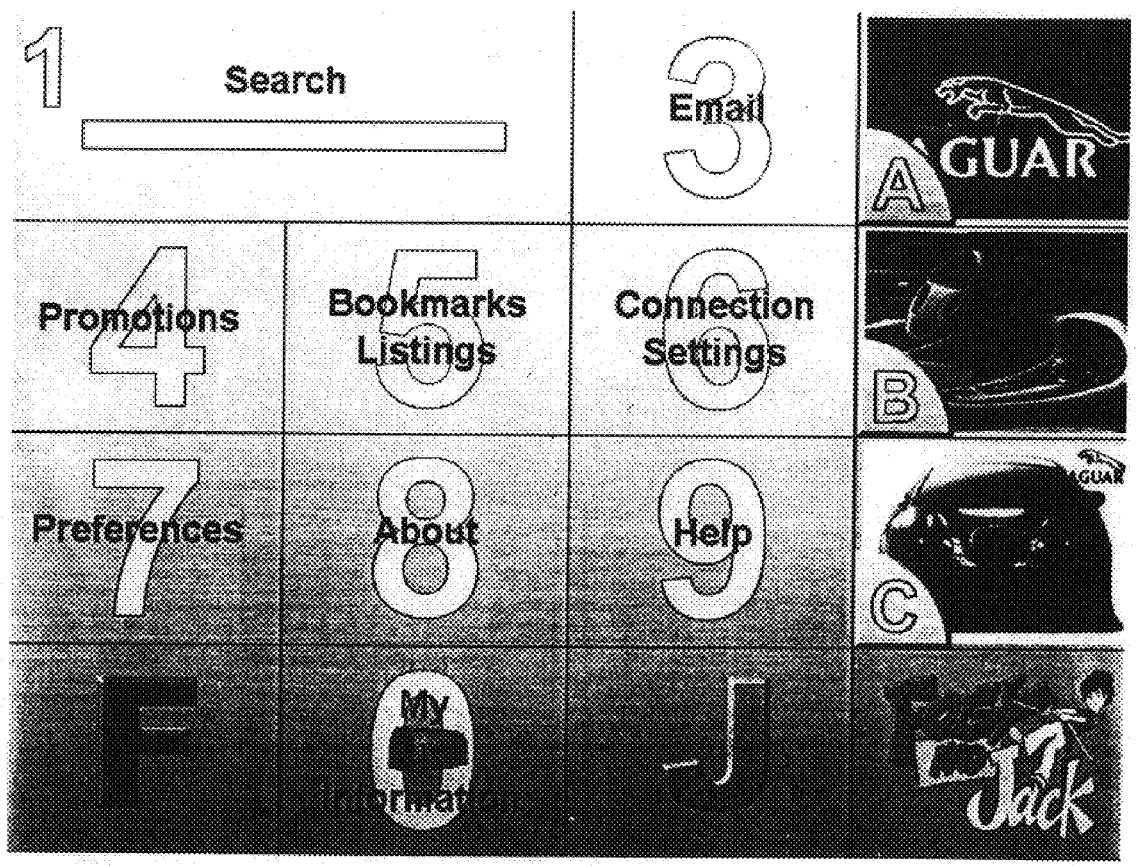
FIG. 9d is a matrix layer corresponding to search and information services.

FIG. 9*a* shows a Main Menu matrix of one embodiment of the invention. In this embodiment, F corresponds to a channel devoted to WAN content searching and e-commerce, and J corresponds to a channel corresponding to content locally hosted by the ISH and locally supplied subscriber services. In one embodiment, pressing F or J on the keyboard any time in navigation mode will generate the corresponding home page matrix layer. FIGS. 9*b* and 9*c* are the home matrix layers for the F and J channels, respectively. The highlight in the corresponding cell indicates to a user which channel they are navigating. FIG. 9*d* is a matrix layer corresponding to search and information services. In one embodiment, the matrix layer may be reached by selecting cell zero from the Main Menu and most other matrix layers.

FIGS. 10*a–g* are a series of matrix layers displayed during an exemplary navigation using one embodiment of the invention. Beginning from the home page of the F channel on which the primary navigation cells each display a broad category as shown in FIG. 9*b*, by pressing 9 on the keypad when the matrix layer of 9*b* is displayed, the system will render the Shopping and Products matrix layer and amend the title bar to show the matrix layer of FIG. 10*a*. A selection of 5 on the 10*a* matrix layer yields an Electronics matrix layer shown in FIG. 10*b*.

Figure 10A:
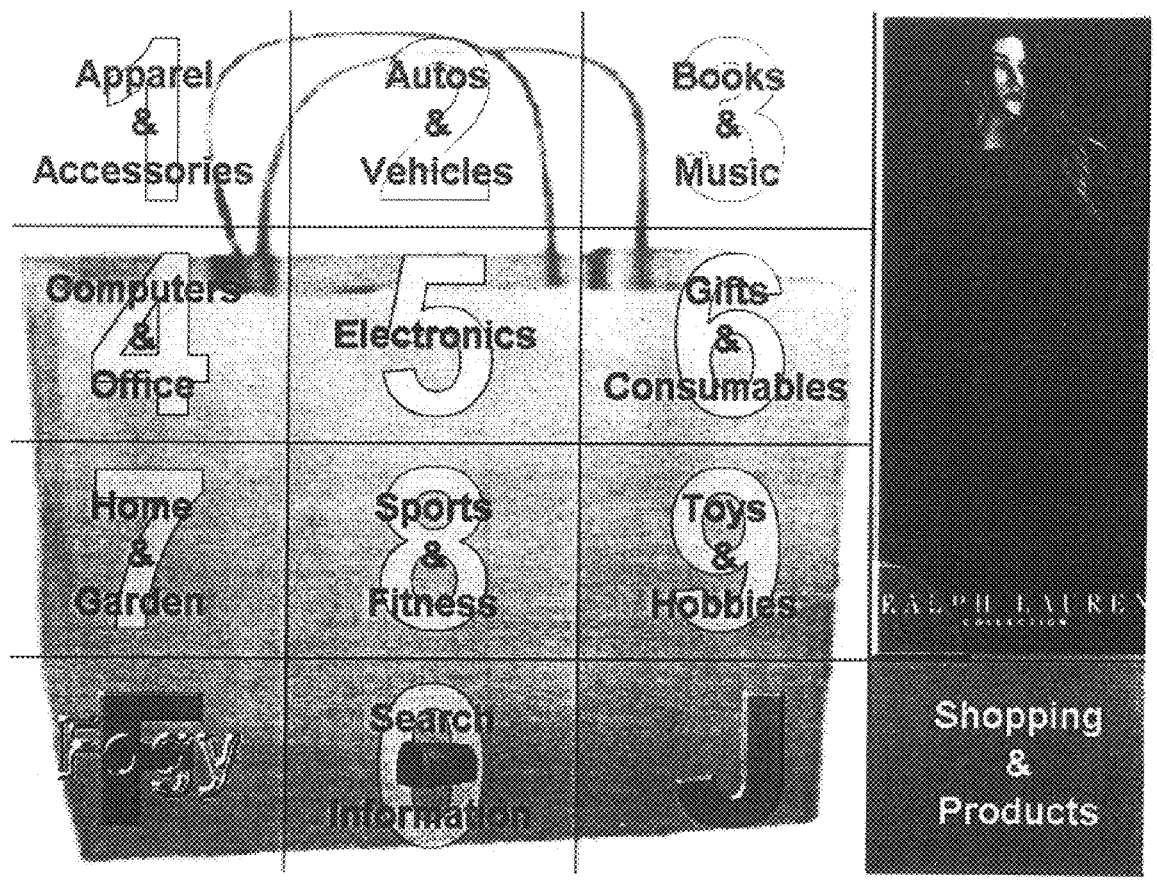
FIGS. 10a–g are a series of matrix layers displayed during an exemplary navigation using one embodiment of the invention.
Figure 10B:
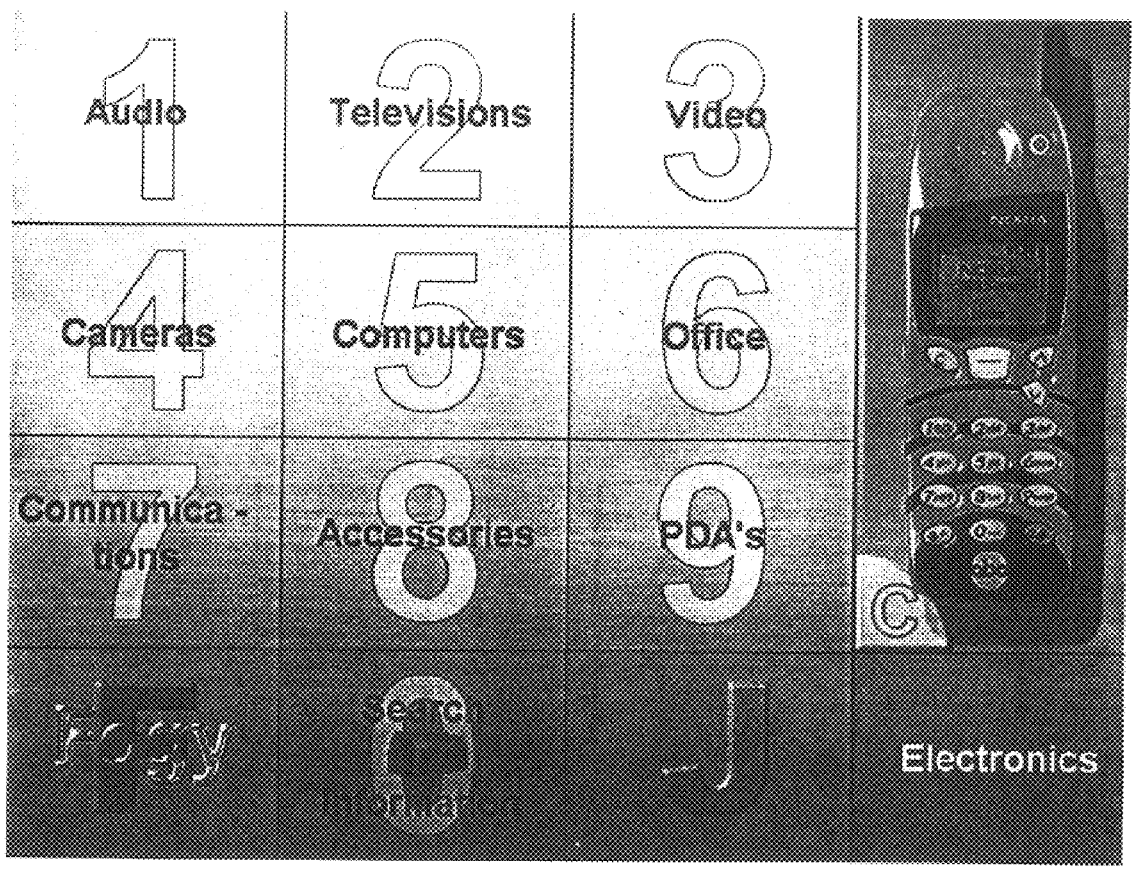
Figure 10C:
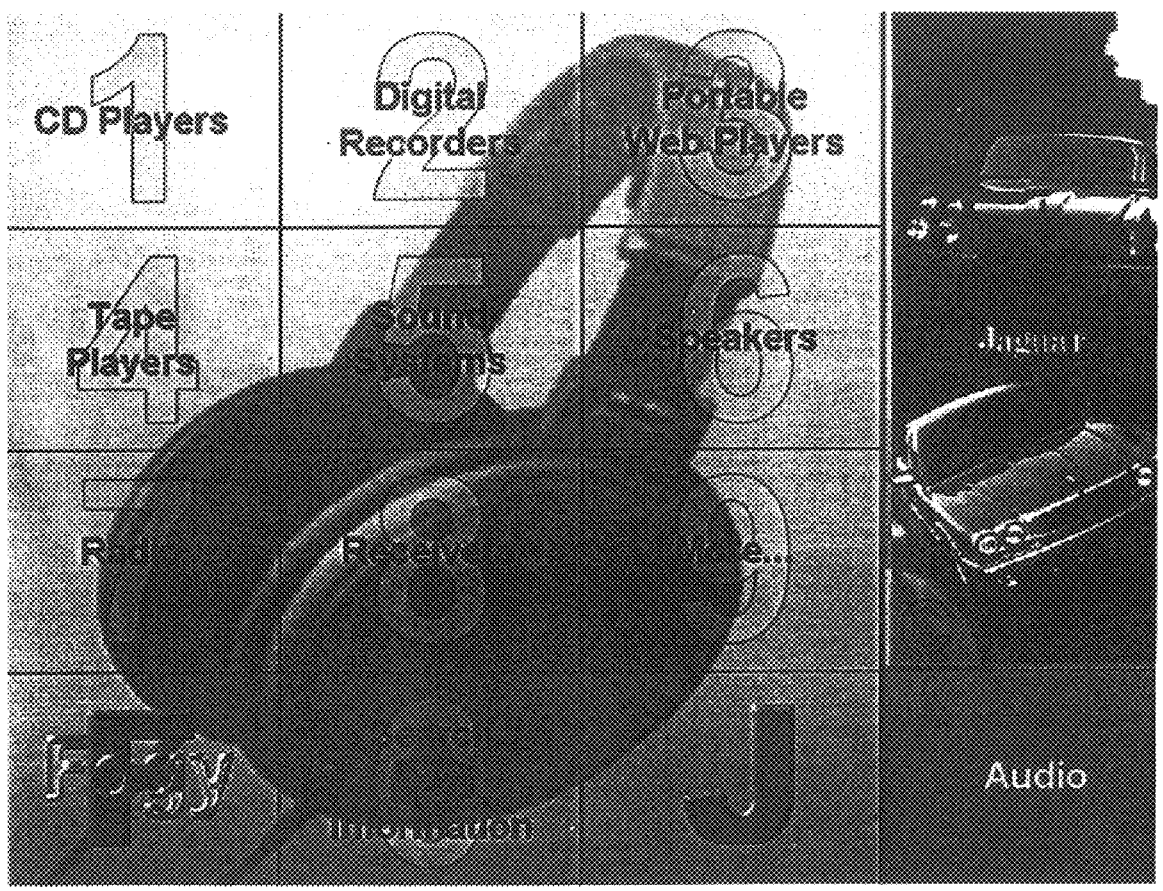
Figure 10D:
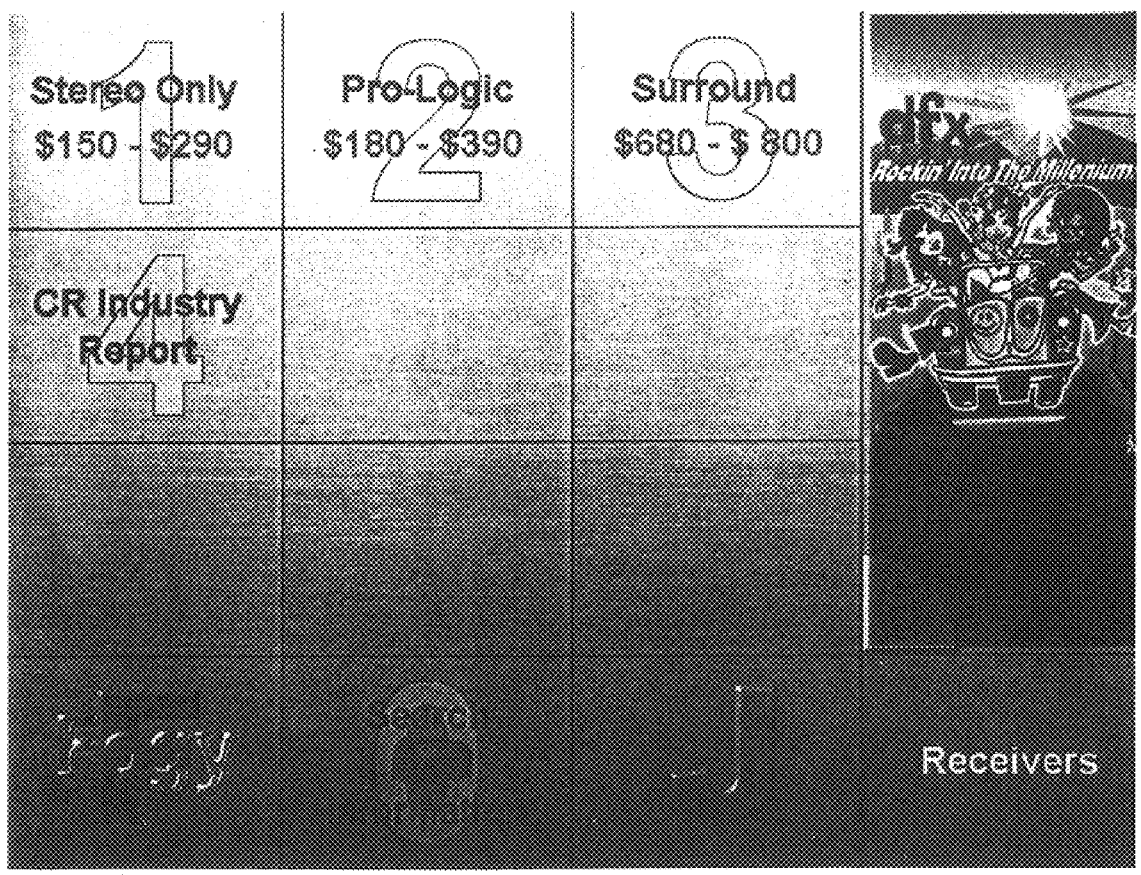
Figure 10E:
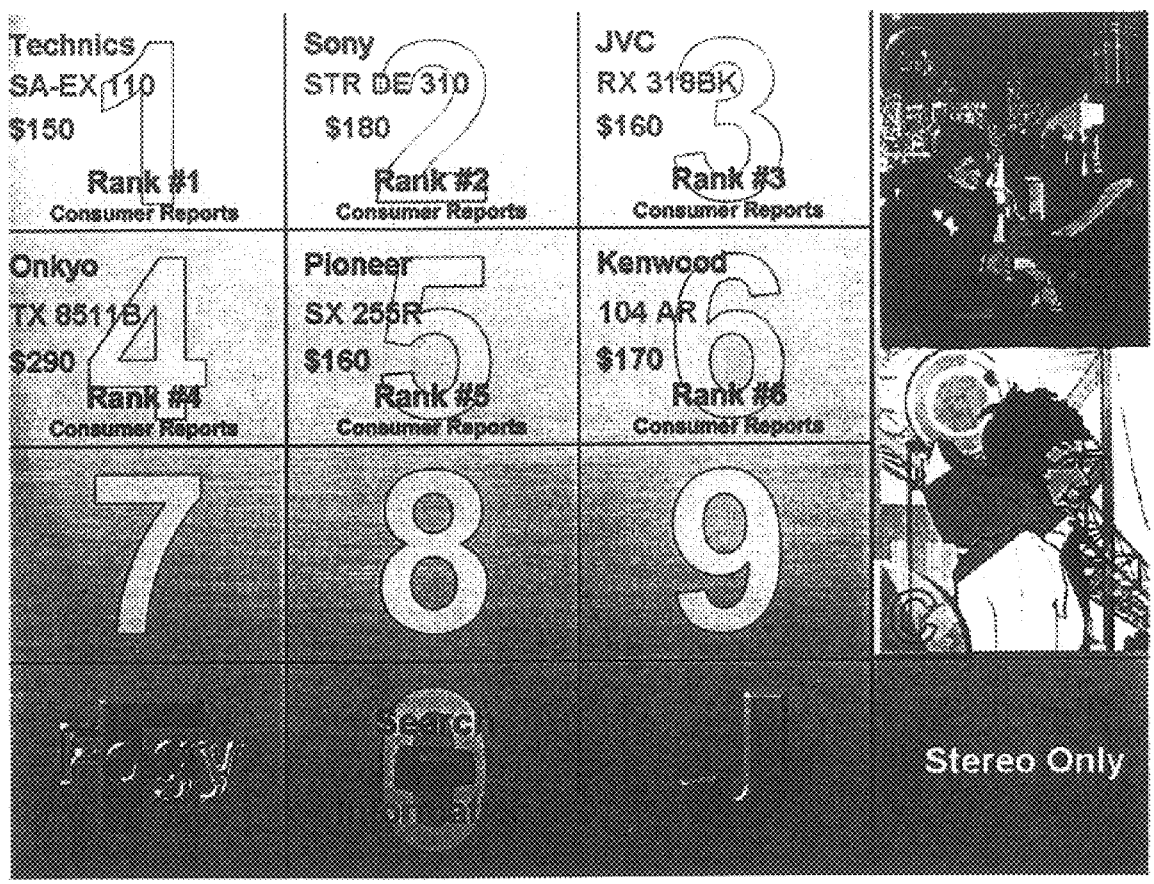

Selecting 1 on the keypad when the matrix layer of 10*b* is displayed yields the Audio matrix layer of FIG. 10*c*. By selecting an 8 on the keypad when 10*c* is displayed, the system displays a Receivers matrix layer of FIG. 10*d*, which breaks down receivers into price categories and also provides the option of navigating, in this embodiment, into Consumer Reports industry reports related to receivers. Notably, in FIG. 10*d*, the number of primary navigation options is reduced to 4. Thus, it is not necessary that all layers of the matrix have the same number of cells, nor is it required that all cells have the same size. A user can select Stereo Only by pressing 1 on the keypad, which yields a stereo only matrix layer shown in FIG. 10*e*.

In one embodiment of the invention, the products are ordered based on some ranking system, such as Consumer Reports. Thus, for example, in FIG. 10*e*, Technics received the highest ranking of receivers in the selected category from Consumer Reports. It is expected that for any particular product class, potential purchasers are likely to only be interested in the top several products within that class, not for example, the $15^{th}$ best receiver in the $150–$290 range. However, it is within the scope and contemplation of the invention to permit a "more" option which allows a user to get a set of the next most highly ranked products and possibly unranked products as well. It is expected that supplying product options in a userfriendly ranked order will encourage users to be more willing to conduct e-commerce.

Figure 10F:
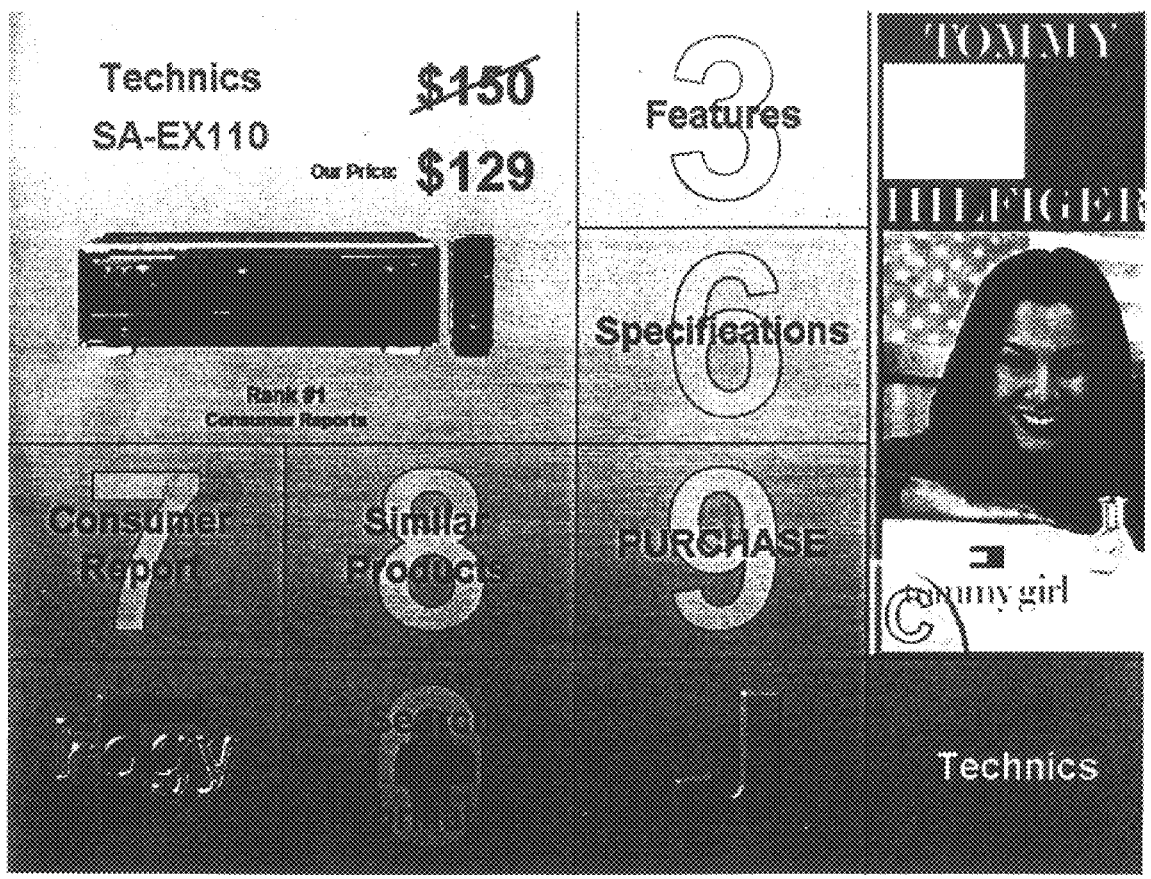
Figure 10G:
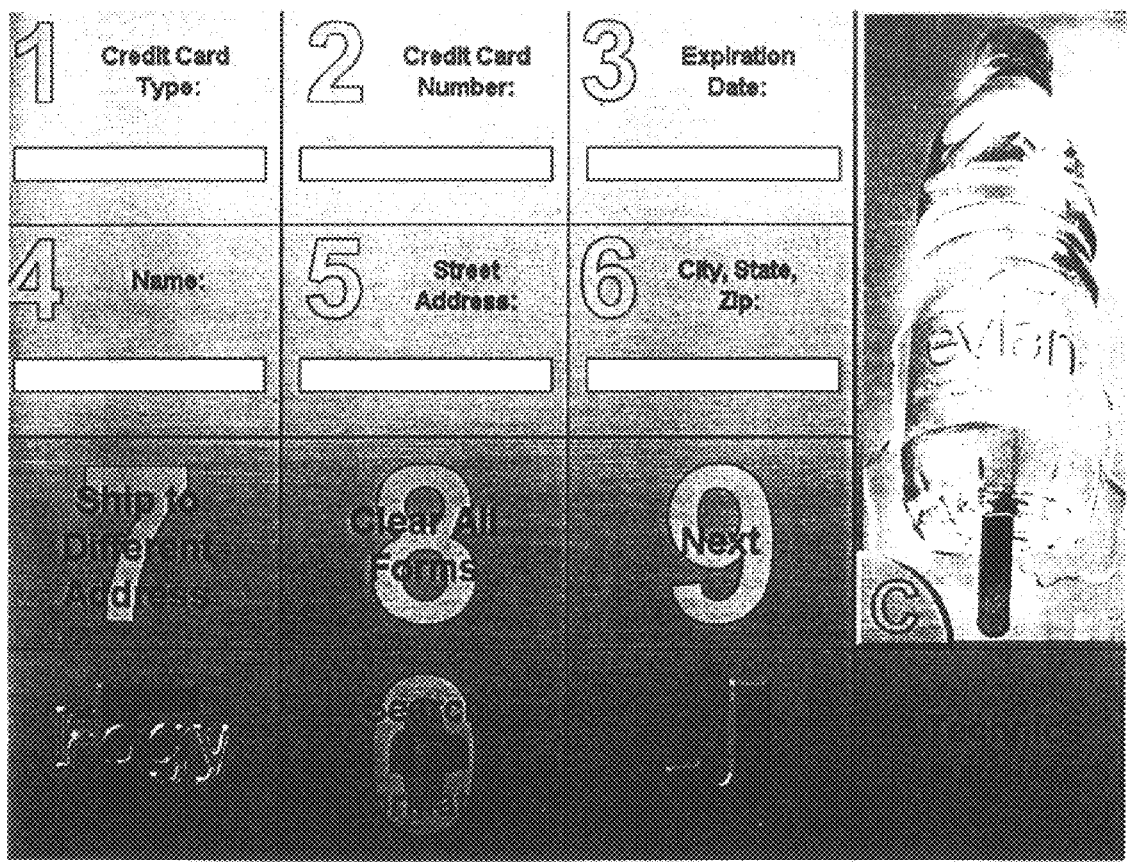

By selecting a 1 on the keypad when matrix layer 10*e* is displayed, a user reaches the matrix layer of FIG. 10*f*, as well as reaching the maximum depth for that navigation path. Thus, pressing 1 on the keypad in response to matrix layer 10*f* does not move the user deeper into the multi-dimensional matrix, and content is displayed in cell 1 indicating the model, price, picture, and possibly other information about the Technics product. Cell 1 is also larger than the other cells.

Other navigation options are provided in additional matrix cells surrounding cell 1 and its content. The additional cells represent navigation paths that have not reached their maximum depth. For example, by pressing a 3, one would get to a features of the Technics product content layer. Such screen would display features of the Technics system. The various navigation paths typically have a maximum depth at which content is displayed. However, reaching the maximum depth of a particular navigation path does not indicate that another navigation path may not have yet a deeper matrix layer. For example, while the maximum depth of the navigation path corresponded to cell 1 has been reach in FIG. 10*f*, selecting a 9 on the keypad will move a user to a Technics purchase matrix layer, shown in FIG. 10*g*. By selecting digits on the keypad, a user can move between fields to fill out a purchase form which, as discussed above, is one example of a matrix layer including composition cells. In some embodiments, the form can be filled in using keyboard input. In other embodiments, the speech to text capabilities of the terminal will permit the user to fill out the electronic purchase form orally.

Figure 11:
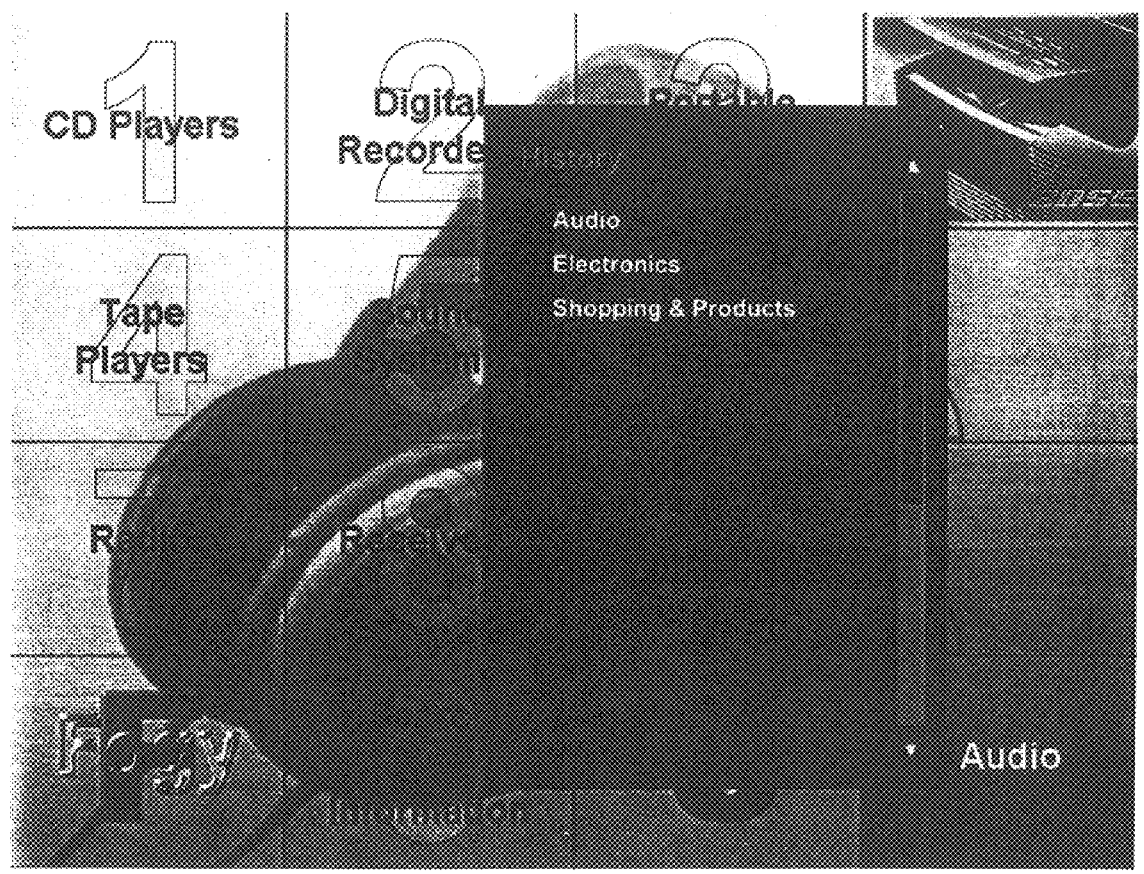
FIG. 11 shows a history window overlying a navigation matrix layer.

FIG. 11 shows a history window overlying a navigation matrix. The history window would appear if the history button on the keypad were actuated. By using the up/down arrow key on the keypad, the user may then select a prior matrix to jump to directly without moving backwards or forwards iteratively.

Figure 12A:
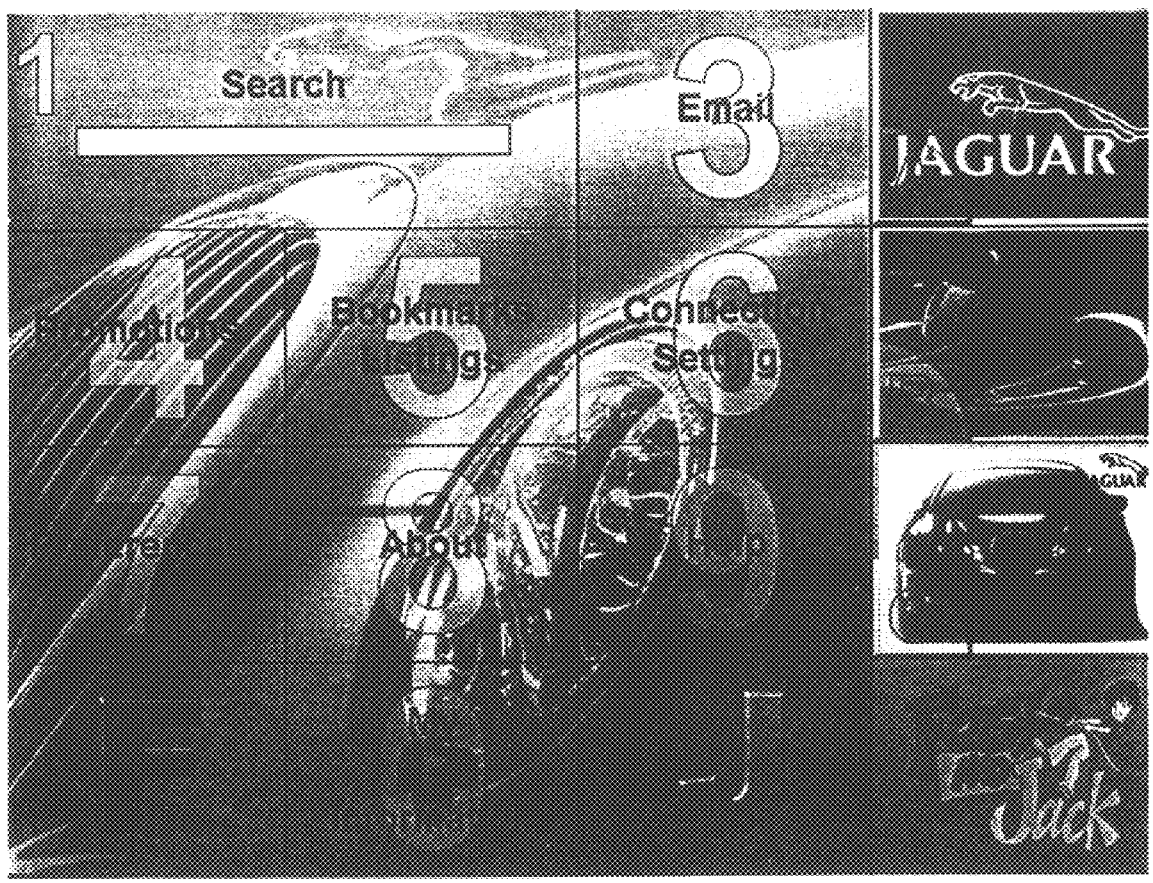
FIGS. 12a and b are an example of a matrix layer of one embodiment of the invention.
Figure 12B:
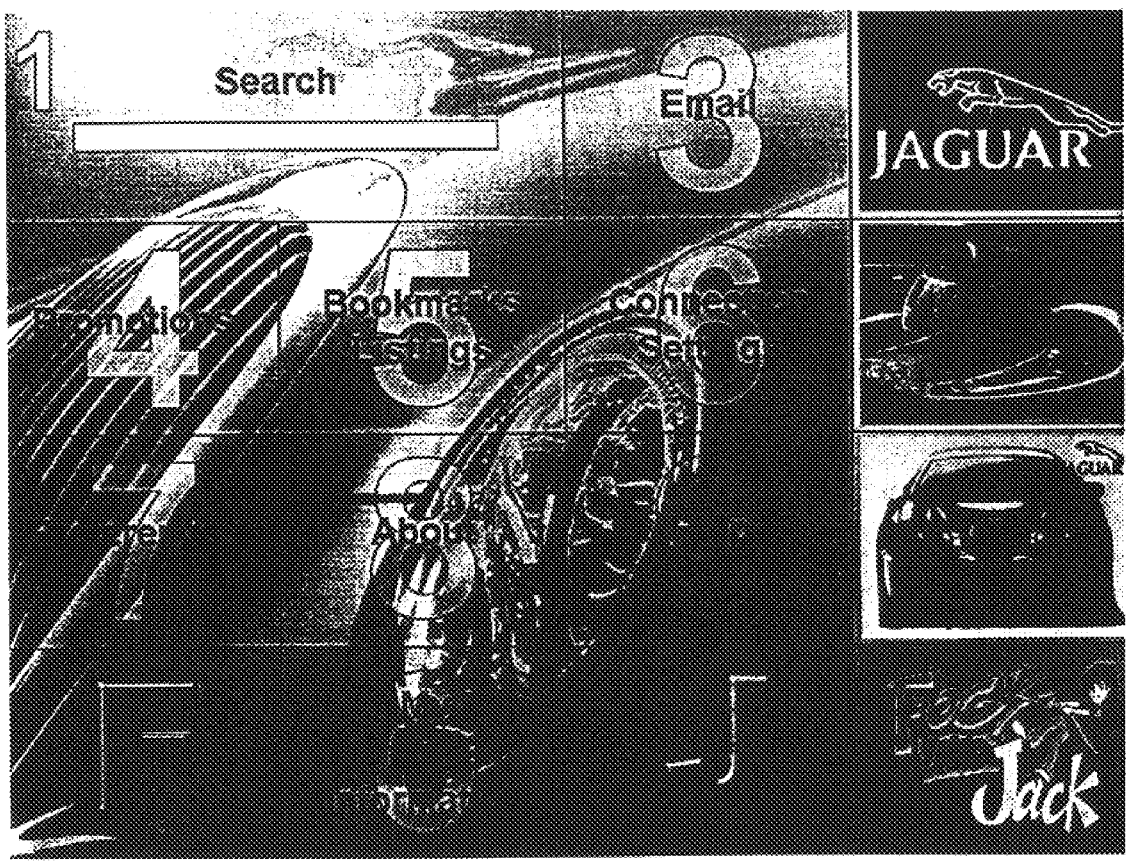

FIGS. 12*a* and *b* are an example matrix after a selection of 0 from the main menu screen, which allows one to conduct a search through cell 1. On this figure, advertisements for Jaguar appear in the ABC cells. In one embodiment of the invention, the ABC designation appears initially (as shown in FIG. 12*a*)when the screen is first refreshed and then fades away to reveal solely the advertisement in each of those cells (as shown in FIG. 12*b*). In this example, pressing an A on the keypad would take the user to a matrix reflecting company information about Jaguar. Pressing B would take the user to a matrix for the virtual showroom, and C would take the user to a purchase screen for the advertised item.

In some cases, the advertising cells are merged as a single cell showing a single advertisement and permitting navigation to only a single matrix layer therefrom. In one embodiment, the background can be an advertisement. This is also shown in FIGS. 12*a* and *b*. Significantly, the advertisement can be targeted by modifying the ad responsive to the apparent navigation path of the user. This leaves the potential of showing the user an advertisement for a product or service more likely to be of interest. For example, when a user selects Electronics in the example of FIGS. 10a–g, the next screen may have as background an advertisement, e.g. for Circuit City.

Figure 13:
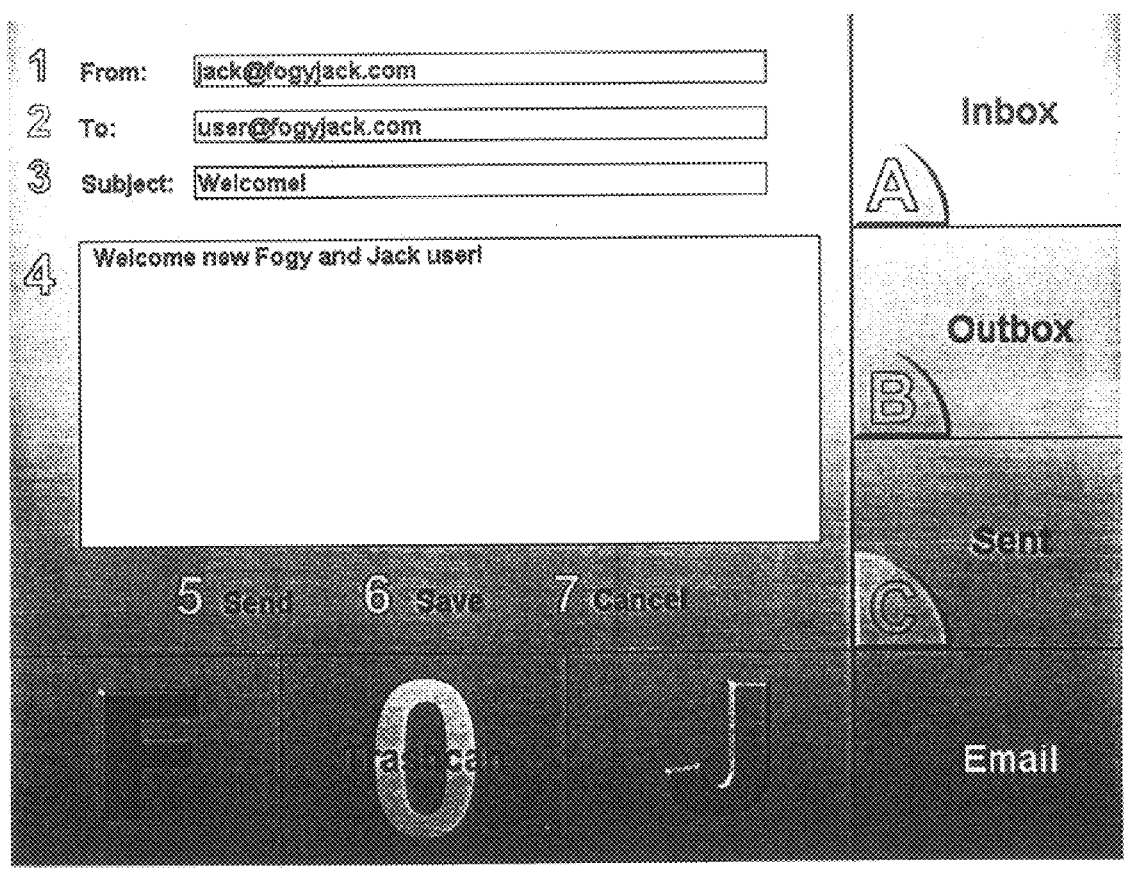
FIG. 13 is an e-mail composition matrix layer for one embodiment of the invention.

FIG. 13 shows the e-mail creation screen for one embodiment of the invention. This would be reached by pressing 3 on the keypad when the matrix layer of FIG. 9d is displayed. Again, all e-mail functions other than actually entering the text and the address can be performed using the simple interface with numerical digits and the letters ABC corresponding to inbox, the outbox, and the sent features of standard e-mail, respectively.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
   displaying, in a client node, a two-dimensional layer of a navigation matrix having a plurality of cells each associated with a unique input;
   receiving a first key press event at a processor on the client node displaying the navigation matrix layer having a first plurality of primary navigation options, the first key press corresponding uniquely to a cell in the matrix;
   forwarding the key press event across a WAN to a server node, and
   receiving a next deeper navigation matrix layer having a second plurality of primary navigation options.

2. The method of claim 1 further comprising:
   iteratively receiving additional key press events and corresponding matrix layers until a maximum depth of a navigation path is reached.

3. The method of claim 2 further comprising:
   receiving a content layer once the maximum depth is reached.

4. The method of claim 1 further comprising:
   determining if a second key press event corresponds to a composition cell;
   entering a composition mode if the second key press corresponds to a composition cell; and
   returning to a navigation mode responsive to a predetermined signal.

5. The method of claim 4 wherein a composition cell is any cell that permits user text input.

6. The method of claim 1 wherein the client node comprises:
   a television.

7. The method of claim 6 wherein the first key press event occurs on a remote control for one of the television and a set top box.

8. The method of claim 1 wherein the navigation matrix layer is a substantially uniform grid of cells.

9. An apparatus comprising:
   a processor;
   a memory coupled to the processor, the memory storing a graphical user interface that defines a portion of a multidimensional navigation matrix;
   a user input device permitting a unique input corresponding to each cell of a current two-dimensional layer of the navigation matrix, the current two dimensional layer having a first plurality of primary navigation options, the processor responding to an input by generating a next deeper layer of the matrix up to a maximum depth, the next deeper layer having a second plurality of primary navigation options.

10. The apparatus of claim 9 wherein the input device is a key pad and the unique input is a single key press.

11. The apparatus of claim 9 further comprising:
    an audio input interface; and
    a speech recognition unit.

12. The apparatus of claim 11 further comprising:
    a speech to text unit.

13. The apparatus of claim 9 wherein the memory is a NVRAM unit.

14. The apparatus of claim 9 wherein the user input device is a key pad wirelessly associated with the processor.

15. The apparatus of claim 14 wherein the key pad is on a remote control that communicates with the processor using infrared signaling.

16. The apparatus of claim 6 wherein the plurality is less than or equal to ten.

17. The apparatus of claim 9 further comprising:
    a television to display the current two-dimensional layer of the navigation matrix.

18. The apparatus of claim 17 wherein the user input device is a television remote control.

19. The apparatus of claim 9 wherein the apparatus is a handheld device.

20. An apparatus comprising:
    a processor;
    a memory coupled to the processor, the memory storing code that defines a portion of a multidimensional navigation matrix;
    a network interface to receive a unique input corresponding to a cell of a current two-dimensional layer of the navigation matrix having a first plurality of primary navigation options, the processor to serve across the network a next deep layer of the matrix having a second plurality of primary navigation options up to a maximum depth in response to an input.

* * * * *